United States Patent [19]
Stein

[11] Patent Number: 5,122,652
[45] Date of Patent: Jun. 16, 1992

[54] MEANS FOR DEFLECTING AND FOCUSING A LIGHT BEAM WITH SILICON OPTICAL MEMBERS

[75] Inventor: Karl-Ulrich Stein, Unterhaching, Fed. Rep. of Germany

[73] Assignee: Siemens Aktiengesellschaft, Munich, Fed. Rep. of Germany

[21] Appl. No.: 581,552

[22] Filed: Sep. 12, 1990

[30] Foreign Application Priority Data

Sep. 29, 1989 [DE] Fed. Rep. of Germany ....... 3932653

[51] Int. Cl.[5] ............................................. H01J 3/14
[52] U.S. Cl. ................................. 250/216; 250/227.24
[58] Field of Search ..................... 250/227.24, 227.29, 250/216, 239; 350/96.15, 445, 447, 286, 287; 357/19

[56] References Cited

U.S. PATENT DOCUMENTS

| 3,807,842 | 4/1974 | Baker | 350/445 |
|---|---|---|---|
| 3,819,272 | 6/1974 | Crozier et al. | 250/216 |
| 4,297,653 | 10/1981 | Scifres et al. | 357/19 |
| 4,699,453 | 10/1987 | Roberts | 350/96.2 |
| 4,807,238 | 2/1989 | Yokomori | 372/32 |
| 4,978,843 | 12/1990 | Yamakawa | 250/216 |

FOREIGN PATENT DOCUMENTS 2162336 1/1986 United Kingdom .

OTHER PUBLICATIONS

"Folded-cavity transverse junction stripe surface-emitting laser" Takeshi Takamori et al., Appl. Phys. Lett. 55(11), Sep. 11, 1989, pp. 1053-1055.
IBM Technical Disclosure Bulletin, vol. 20, No. 4, Sep. 1977, pp. 1606-1608.

Primary Examiner—David C. Nelms
Attorney, Agent, or Firm—Hill, Van Santen, Steadman & Simpson

[57] ABSTRACT

A device for deflecting and focusing a light beam comprising a silicon member comprising an optical infeed face arranged facing the supplied light beam for coupling the light beam into the silicon member, and comprising an optical deflection face for deflecting the light beam propagating in the member and comprising a focusing means attached or fashioned at the silicon member for focusing the light beam. This device can be secured to a bottom plate of a light waveguide component and photodetectors and electrical circuits can be integrated on the member K. The device can particularly be employed for optical communication technology, particularly for a data link.

21 Claims, 2 Drawing Sheets

MEANS FOR DEFLECTING AND FOCUSING A LIGHT BEAM WITH SILICON OPTICAL MEMBERS

BACKGROUND OF THE INVENTION

The invention relates to a means for deflecting and focusing a light beam. A number of light waveguide components use a formatting and housing technology that makes it necessary to mount an opto-electronic transducer chip, particularly a laser chip, perpendicularly relative to the plane of electrical "in-line" terminals such as a plane of a circuit board, a necessarily complex arrangement involving great outlay. This housing technology, however, is also especially interesting and attractive for cost-beneficial components on a TO-like bottom plate for fiber-optical connections that can be integrated directly into a fiber plug or a corresponding socket.

In currently known arrangements, laser chips having lateral beam direction are mounted on a pedestal perpendicular to the connecting plane, the spherical lens required for the focusing is adjusted relative thereto in a mechanical mount. Lasers having a beam direction perpendicular to their surface are under development. Planar components wherein the beam incidence is perpendicular to their surface by their very nature are employed as detectors.

SUMMARY OF THE INVENTION

It is an object of the invention to provide a device to direct a light beam into a suitable direction and focus, in a light waveguide component.

This object is achieved with a means for deflecting and focusing a light beam, characterized by a member of silicon having an infeed face arranged in the supplied light beam for coupling the light beam into the member, comprising an optical deflection face for defecting the light beam propagating in the member and by a focusing means attached to or fashioned at the member for focusing the light beam.

The means of the invention has the advantage that it can be mounted on a bottom plate together with an opto-electronic transducer chip, for example a laser chip or photodetector chip. In the case of a TO-laser component, the laser beam can be advantageously brought into the direction suitable for a plug with the means of the invention, and can be focused onto the proper location in the plug.

The employment of a member of silicon has the advantage that the optical deflection surfaces or other optical surfaces as well can be acquired from the privileged surfaces of the silicon crystal as can be exposed, for example, with chemical-anisotropic etching. Polished and isotopically etched faces can also be additionally advantageously employed.

An advantageous development of the means of the invention is characterized by a photodetector integrated on the member, said photodetector being arranged such that it receives at least one part of the light beam, which has the advantage that, given a transmitter arrangement, for example a component having a laser chip, an electrical monitor signal for controlling the transmitter, for example the laser current, is available on the basis of the integrated photodetector. Further, this means is advantageously suitable for a receiver arrangement.

An advantageous development of the arrangement of the invention is characterized in that along with the photodetector integrated on the member, receiving a part of the light beam, an electrical control circuit and/or a driver circuit for a laser chip, or an electrical amplifier for a photodetector, are also integrated on the member. A transducer that is fully compatible with the logic signals can thus be cost-beneficially manufactured on the electrical side.

A photodetector, for example the photodetector for generating the monitor signal, is preferably a planar diode, for example a planar diode based on the Schottky barrier principle that, in particular, can also be coupled to an integrated waveguide. Such diodes coupled to an integrated waveguide are proposed in the earlier German Patent Application P 39 00 422.8 and corresponding published European Patent Application EP 0 378 112 AZ. These proposed diodes come into consideration as photodetector for the means of the invention.

The member of silicon in the means of the invention can be manufactured of a standard, polished Si wafer having the orientation 100. Particular advantages derive when the wafer has its crystallographic axes oriented such that an infeed face is arranged at an oblique angle relative to the beam direction of the supplied light beam, and the light beam that is infed and propagates in the member deflects at an optical deflection face by total reflection in the silicon. Such an orientation can be achieved in the prior art by sawing or by "mis-oriented" drawing.

A deflection face of the member of silicon can also be obtained by a metallized surface of the silicon crystal.

The member of silicon also carries the focusing means. This focusing means is preferably composed of a lens that partially resides in a preferably etched depression for adjusting and fashioning this lens. The lens can be composed of sapphire or, preferably, a silicon, or can be a planar lens, for example a Fresnel lens. Such planar lenses are proposed in the earlier German Patent Application P 38 33 096.2 and corresponding U.S. application Ser. No. 404,639, now U.S. Pat. No. 4,993,799. Given employment of a lens of silicon, this material can be locally secured in the depression self-aligning with a gold eutectic or with phosphorous glass.

A means of the invention especially suited for transmitter arrangements on a bottom plate or like surface has the features that said member comprises an optical outfeed face arranged in the deflected light beam for coupling said light beam out of said member whereby said focusing means is arranged on said outfeed face, and a photodetector, that receives a part of the light beam conducted to the outfeed face, is integrated next to said focusing means.

The means of the invention, however is also excellently suited for receiver arrangements on a bottom plate or like surface. A development of the means of the invention that is especially advantageous for this purpose is characterized in that said focusing means is arranged on said infeed face; and in that said deflection face deflects the light beam that is infed and propagates in said member in a direction to a further face on which said photodetector, to which the deflected light beam is conducted, is integrated. Preferably, a further feature is characterized in that an optical waveguide is integrated at said further face of said member, the deflected light beam being at least partially coupled into said optical waveguide, said optical waveguide conducting the infed light to the photodetector coupled to said waveguide. The photodetector is fashioned in the form of a planar diode that enables an "upside-down" mounting. An advantageous development of the means is where the waveguide comprises a taper, with whose measure the capacitance of the diode coupled to the waveguide can be kept low.

The invention shall be set forth in greater detail by way of example below in the following descriptions with reference to the figures.

DETAILED DESCRIPTION OF THE PREFERRED EMBODIMENT

Figure 1:
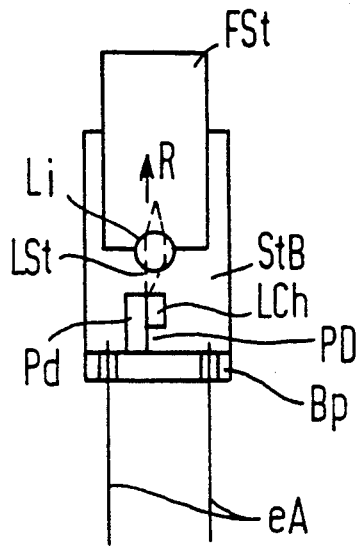
FIG. 1 is a schematic sectional view through a traditional waveguide component having a fiber plug.

A traditional light waveguide component is shown in FIG. 1, comprising a plug bush StB for a fiber plug FSt. The plug bush StB comprises a bottom plate Bp having electrical terminals eA. A laser chip LCh having lateral beam direction is laterally fixed such as in the plug bush StB and in a pedestal Pd secured on the bottom plate Bp, such that a beam direction R points vertically up with reference to the drawings. A light beam or laser beam LSt composed of a laser beam, impinges a lens Li secured at or in the fiber plug FSt, this lens Li focusing the light beam LSt onto a fiber (not shown) secured into the plug FSt. A photodetector PD for generating an electrical monitor signal for regulating the laser current is fixed to the pedestal Pd between the bottom plate Bp and the laser chip LCh.

Figure 2:
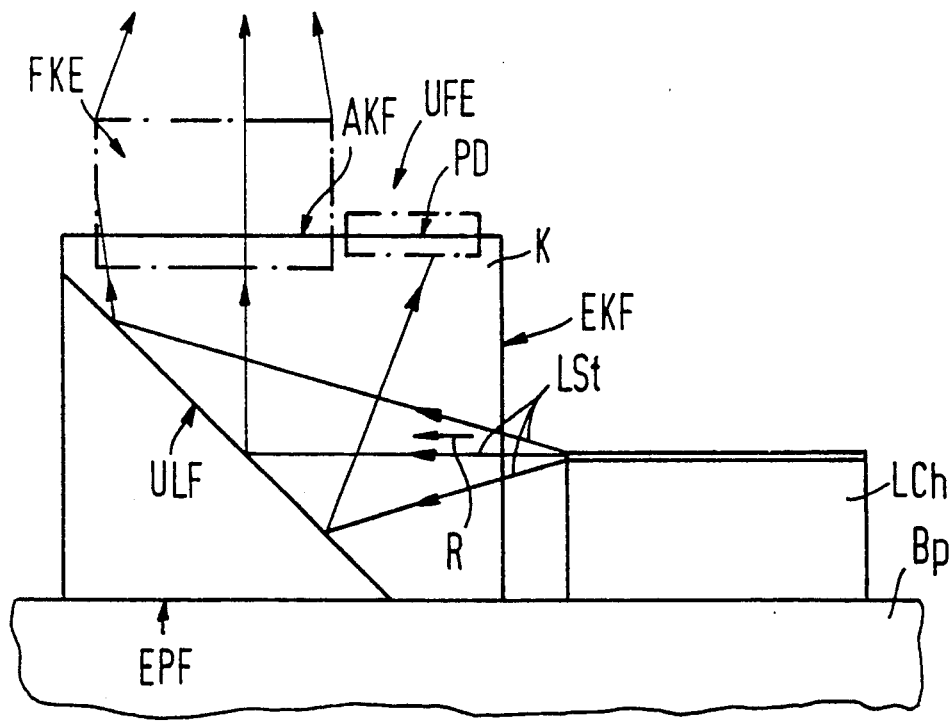
FIG. 2 is a side view of an exemplary embodiment of a means of the invention for a transmitter arrangement on a bottom plate, particularly for the component of FIG. 1.
Figure 3:
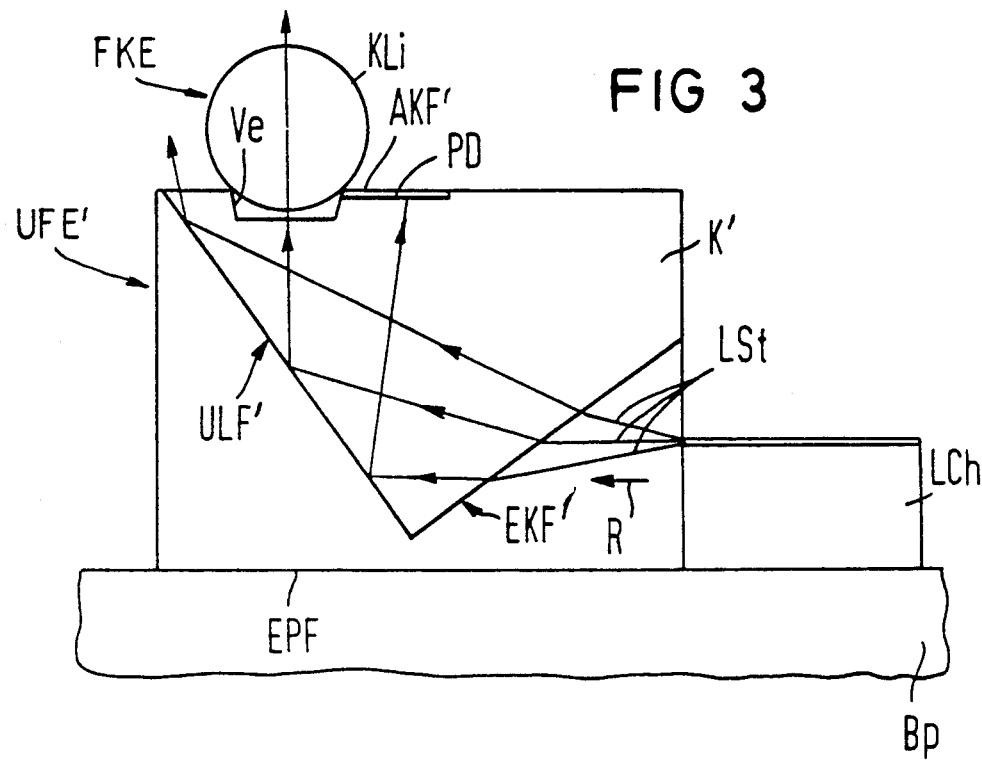
FIG. 3 is a side view of a specific development of the exemplary embodiment of FIG. 2 in the same form of illustration.

A function unit composed of the lens Li, the laser chip LCh, the photodetector PD and the pedestal Pd as shown in FIG. 1 is inventively replaced by a second function unit composed of the laser chip LCh and a guide means UFE for deflecting and focusing a light beam according to FIGS. 2 and 3, this second function unit being secured on the bottom plate Bp.

Differing from the first function unit of FIG. 1, the laser chip LCh, having lateral beam direction, is directly secured on the bottom plate Bp in the inventive second function unit of FIG. 2 or FIG. 3, so that the beam direction R is essentially horizontal with reference to the drawing. The divergent laser beam emitted in this horizontal direction R, and forming the light beam LSt, is deflected into a vertically upward direction by the guide means UFE, UFE' and is focused onto the fiber (not shown) of the fiber plug FSt. Fiber plugs without lens can therefore be employed.

In FIG. 2 the guide means UFE comprises a member K of silicon arranged in the laser beam LSt and secured along a further surface EPF on what is the horizontal bottom plate Bp in the drawing. The member K of silicon comprises an optical infeed face EKF for coupling the light beam LSt into the member K, an optical deflection face ULF for deflecting the thus infed laser beam LSt vertically upward, and an optical outfeed face AKF for coupling the deflected laser beam LSt out of the member K. The guide means UFE further comprises a focusing means FKE for focusing the light beam LSt, and is secured to or fashioned at the member K.

In the example of FIG. 2, the infeed face EKF is a lateral face of the member K in vertical orientation with respect to the horizontal orientation of the bottom plate Bp, and that faces toward the laser chip Lch. The deflection face ULF is a face of the member K arranged at an oblique angle relative to the bottom plate Bp, this deflection face of the member K being arranged at a side of the member K facing away from the laser chip Lch and, for example, being metallized and also being capable of being manufactured by anisotropic etching of the member K. The outfeed face AKF is situated at a side of the member K facing away from the bottom plate BP, or top side with respect to FIG. 2. The focusing means FKE is arranged on the member K at this top side, and the photodetector PD is integrated on the member K immediately next to this focusing means FKE and receiving a part of the deflected light beam Lst conducted to the outfeed face AKF and generating a monitor signal therefrom for regulating the laser beam.

The example of FIG. 3 differs from the example of FIG. 2 in that a guide means UFE' comprising a member K' has an infeed face EKF' arranged at an oblique angle relative to the bottom plate Bp and, thus, is also arranged obliquely relative to the beam direction R, and beam deflection at the deflection face ULF' ensues on the basis of total reflection in the silicon. This infeed face EKF' and this deflection face ULF' can be manufactured by anisotropic etching given a suitable orientation of the crystallographic axes of the silicon member. In the example of FIG. 3, the laser chip Lch can be brought closer to the member K'.

Figure 4:
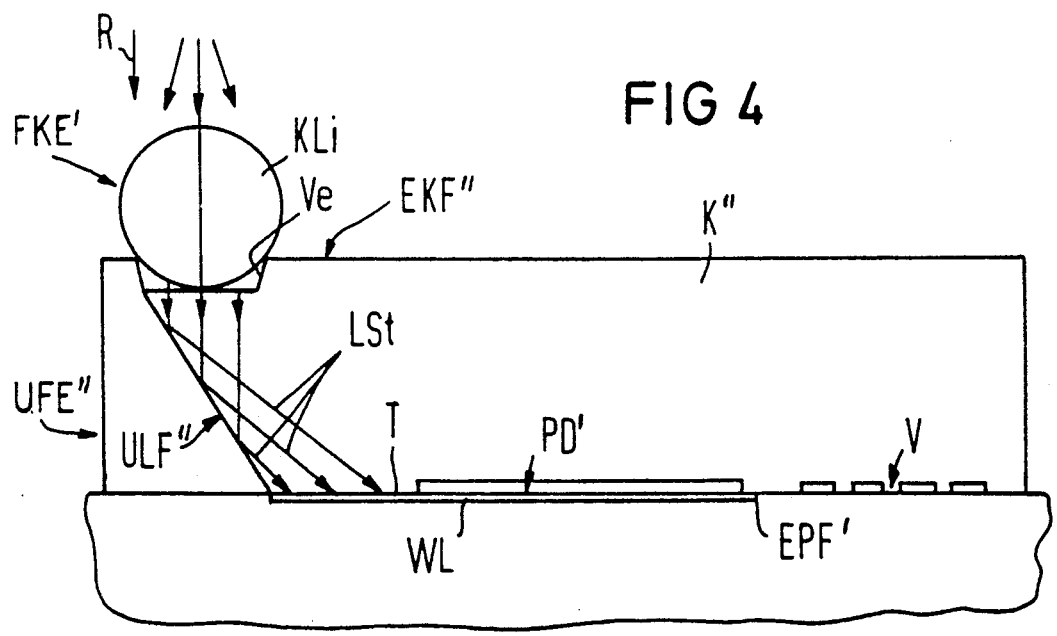
FIG. 4 is a side view of an exemplary embodiment of a means of the invention for a receiver arrangement on a bottom plate.

The function unit composed of the lens Li, the laser chip Lch, the photodetector PD and the pedestal Pd in the component of FIG. 1 is inventively replaced in the exemplary embodiment of FIG. 4 by a third function unit comprising a receiver arrangement which comprises the means UFE" for conversion and focusing of a light beam from the fiber of the plug Fst (not shown), and the photodetector PD'. The photodetector PD' forms a reception detector; no laser chip is used in FIG. 4. Differing further from the examples of FIGS. 2 and 3, the focusing means FKE' in the example of FIG. 4 is arranged on the infeed face EKF" of a member K'" that, in this example, faces away from the bottom plate Bp because it must face toward the fiber of the plug Fst in order to receive the light beam Lst emerging therefrom. The light beam Lst that propagates in vertically downward direction of FIG. 1 is coupled into the member K" by the infeed face EKF"', the light beam Lst propagates in this member K" and is deflected by a deflection face ULF" in the direction of a base face or further face EPF' of the member K" at which the photodetector PD', to which the deflected light beam is conducted, is integrated. The further face EPF' is preferably a bottom surface of the member K" by which this member K" lies on the bottom plate Bp. The photodetector PD' is particularly a planar diode in this case that is especially suitable for an "upside-down" mounting, to receive the deflected light beam Lst.

In particular, a planar diode coupled to an integrated optical waveguide WL is suited for this purpose, particularly a diode according to the Schottky barrier principle, whereby structures that are proposed in the earlier German Patent Application P 39 00 422.8 and corresponding published European Patent Application EP 0 378 112 AZ are especially suitable therefor.

In the example of FIG. 4, the light deflected by the deflection face ULF" obliquely impinges the waveguide WL integrated at the further face EPF', is coupled into this waveguide WL and is conducted therein to the photodetector PD' that is coupled to the waveguide WL. In order to keep the capacitance of the photodetector PD' low, a taper T is provided between the location at which the light is coupled into the waveguide WL and the photodetector PD'.

An electrical amplifier V connected to the photodetector PD' is preferably integrated on the member K" of silicon, for example on the further face EPF' of this member K".

In all exemplary embodiments, the focusing means FKE, FKE' can be composed of a lens, for example a spherical lens KLi, secured in the depression Ve, as shown in the examples of FIGS. 3 and 4 or can also be realized with a planar lens, for example with planar lenses that were proposed in the earlier German Patent Application P 38 33 096.2 and corresponding U.S. application Ser. No. 404,639, now U.S. Pat. No. 4,993,799.

Although the present invention has been described with reference to a specific embodiment, those of skill in the art will recognize that changes may be made thereto without departing from the scope and spirit of the invention as set forth in the appended claims.

I claim as my invention:

1. A device for deflecting and focusing a light beam emanating from a source comprising:
   a member comprising silicon, having an infeed face arranged facing the light beam, said infeed face coupling the light beam into said member, and having an optical deflection face for deflecting the light beam propagating in the member; and
   a focusing means mounted on said member for focusing the light beam.

2. A device according to claim 1, wherein said device further comprises a photodetector integrated on said member, said photodetector arranged to receive at least part of the light beam thereon.

3. A device for deflecting and focusing a light beam emanating from a source comprising:
   a member comprising silicon, having an infeed face arranged facing the light beam, said infeed face coupling the light beam into said member, and having an optical deflection face for deflecting the light beam propagating in the member;
   a focusing means mounted on said member for focusing the light beam;
   a photodetector integrated on said member, said photodetector arranged to receive at least part of the light beam thereon; and
   an electrical control circuit integrated thereon, said circuit receiving the signal from said photodetector; and
   said circuit electrically influences emanating performance of said source depending on said signal from said photodetector.

4. A device according to claim 3, wherein said electrical control circuit comprises a driver circuit.

5. A device according to claim 2, wherein said member comprises an electrical amplifier integrated thereon, said amplifier receiving a signal from said photodetector and influencing said signal.

6. A device according to claim 1, wherein said deflection face of said member is a metallized surface of said member.

7. A device according to claim 1, wherein said infeed face is arranged at an oblique angle relative to a direction of said light beam, said light beam propagates in said member and is deflected at said optical deflection face by total reflection in the member.

8. A device according to claim 1, wherein said focusing means comprises a lens, and said member has a depression formed thereon, said depression holding a portion of said lens therein for adjusting and fastening said lens to said member.

9. A device according to claim 8, wherein said focusing means comprises a planar lens.

10. A device according to claim 1, wherein said member further comprises an optical outfeed face for coupling said light beam out of said member.

11. A device according to claim 1, wherein said focusing means is mounted on said infeed face, said focusing means receiving and focusing the light beam from the source onto said infeed face; and
   said deflection face deflects said light beam propagating from said infeed face in said member, in a direction to a further face; and
   said device further comprises a photodetector, said photodetector integrated on said further face, and said light beam is conducted to said photodetector.

12. A device for deflecting and focusing a light beam emanating from a source comprising:
   a member comprising silicon, having an infeed face arranged facing the light beam, said infeed face coupling the light beam into said member, and having an optical deflection face for deflecting the light beam propagating in the member;
   a focusing means mounted on said member, and having an optical outfeed face for coupling said light beam out of said member for focusing the light beam;
   wherein said focusing means is mounted on said optical outfeed face.

13. A device according to claim 12, wherein said device further comprises a photodetector, said photodetector receiving a part of said light beam, said photodetector integrated into said member adjacent to said focusing means on said outfeed.

14. A device for deflecting and focusing a light beam emanating from a source comprising:
   a member comprising silicon, having an infeed face arranged facing the light beam, said infeed face coupling the light beam into said member, and having an optical deflection face for deflecting the light beam propagating in the member, and having a further face, said deflection face deflects said light beam propagating from said infeed face in said member, in a direction to said further face;
   a focusing means mounted on said member for focusing the light beam, wherein said focusing means is mounted on said infeed face, said focusing means receiving and focusing the light beam from the source onto said infeed face;
   a photodetector, said photodetector integrated on said further face; and
   an optical waveguide integrated at said further face of said member and leading to said photodetector, said light beam being at least partially coupled into said optical waveguide, said optical waveguide conducting said light beam to said photodetector, said photodetector coupled to said waveguide, and said photodetector comprising a planar diode.

15. A device according to claim 14, wherein said waveguide comprises a tapered configuration.

16. A transmitter device for transmitting a lateral light beam to an optical fiber arranged with an end of the optical fiber oriented axially perpendicular to the lateral light beam, comprising:
   a bottom plate;
   a laser chip emitting a lateral light beam mounted onto said bottom plate;
   a member comprising silicon, mounted onto said bottom plate adjacent to said laser chip, comprising:
      an infeed face receiving said light beam and coupling said light beam into said member;
      a deflection face facing outward of said member obliquely away from said laser chip, receiving the light beam propagating through said member, said reflection face internally reflecting said light beam in a direction toward said optical fiber; and
      an outfeed face coupling said light beam received from said deflection face out of said member toward said optical fiber; and
   a focusing means, mounted on said member for focusing at least a part of said light beam received from said outfeed face toward said optical fiber.

17. A transmitter device according to claim 16, wherein said transmitter device further comprises a photodetector integrated on said outfeed face and receiving a part of said light beam; and an electronic circuit integrated onto said member, said electronic circuit acting to control said laser chip, said electronic circuit receiving a signal from said photodetector.

18. A transmitter device according to claim 17, wherein said outfeed face has a depression formed thereon and said focusing means comprises a spherical lens secured in said depression.

19. A transmitter device according to claim 18, wherein said infeed face is arranged at an oblique angle to said lateral light beam, facing in an outward direction from said member toward said laser chip and toward said bottom plate.

20. A receiver device for receiving a light beam from a fiber optic cable comprising:
   a bottom plate;
   a focusing means for receiving and focusing said light beam;
   a member comprising silicon, comprising:
      a base face, said member mounted onto said bottom plate along said base face;
      an infeed face arranged adjacent to said focusing means and receiving said light beam focused by said focusing means and coupling said light beam into said member;
      a deflection face facing outward of said member at an oblique angle, said deflection face receiving said light beam propagating through said member from said infeed face, and reflecting said light beam onto said base face;
      an optical waveguide integrated at said base face and receiving the light beam from said deflection face, said light beam being at least partially coupled into said optical waveguide;
      a photodetector comprising a planar diode integrated into said base face, said optical waveguide conducting said light beam to said photodetector and
      an electric amplifier integrated onto said base face, said electric amplifier conditioning signal from said photodetector.

21. A device according to claim 20, wherein said infeed face comprises a depression; and said focusing means comprises a spherical lens, said spherical lens secured into said depression.

* * * * *